US011461327B1

(12) United States Patent
Cruanes et al.

(10) Patent No.: US 11,461,327 B1
(45) Date of Patent: Oct. 4, 2022

(54) QUERY PLAN CACHING FOR NETWORKED DATABASE SYSTEMS

(71) Applicant: Snowflake Inc., Bozeman, MT (US)

(72) Inventors: Thierry Cruanes, San Mateo, CA (US); Xuelai Cui, Seattle, WA (US); Sangyong Hwang, Sammamish, WA (US); Allison Waingold Lee, Pebble Beach, CA (US); Boyung Lee, Kirkland, WA (US); Nicola Dan Onose, San Jose, CA (US); William Waddington, Stateline, NV (US); Jiaqi Yan, Menlo Park, CA (US); Li Yan, Redmond, WA (US); Yongsik Yoon, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/658,535

(22) Filed: Apr. 8, 2022

(51) Int. Cl.
G06F 16/2453 (2019.01)
(52) U.S. Cl.
CPC .. G06F 16/24542 (2019.01); G06F 16/24539 (2019.01)
(58) Field of Classification Search
None
See application file for complete search history.

(56) References Cited

U.S. PATENT DOCUMENTS

| | | | | |
|---|---|---|---|---|
| 2005/0256854 | A1* | 11/2005 | Rajamani | G06F 16/24524 |
| 2009/0106321 | A1* | 4/2009 | Das | G06F 16/24542 |
| 2011/0029508 | A1* | 2/2011 | Al-Omari | G06F 16/24542 |
| | | | | 707/718 |
| 2011/0167056 | A1* | 7/2011 | Khanolkar | G06F 16/24542 |
| | | | | 707/718 |
| 2012/0179669 | A1* | 7/2012 | Al-Omari | G06F 16/24524 |
| | | | | 707/E17.131 |
| 2018/0349404 | A1* | 12/2018 | Noh | G06F 16/244 |
| 2019/0087457 | A1* | 3/2019 | Bellamkonda | G06F 16/24553 |

* cited by examiner

*Primary Examiner* — Christopher J Raab
(74) *Attorney, Agent, or Firm* — Schwegman Lundberg & Woessner, P.A.

(57) ABSTRACT

The subject technology receives a query, the query including a set of statements for performing the query. The subject technology populates a compilation context based at least in part the query. The subject technology provides the compilation context to a compiler. The subject technology invokes the compiler to perform a compilation process based on the compilation context, the compilation process comprising performing a lookup operation on a stored plan cache for an exact match based on information from the compilation context, the stored plan cache including a set of stored query plans, and determining whether the exact match of a particular query plan is found in the stored plan cache to avoid compiling the query using the compilation context.

27 Claims, 13 Drawing Sheets

QUERY PLAN CACHING FOR NETWORKED DATABASE SYSTEMS

TECHNICAL FIELD

Embodiments of the disclosure relate generally to databases and, more specifically, to resource management related to performing tasks in conjunction with such databases.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Databases are widely used for data storage and access in computing applications. A goal of database storage is to provide enormous sums of information in an organized manner so that it can be accessed, managed, and updated.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

When certain information is to be extracted from a database, a query statement may be executed against the database data. A network-based database system processes the query and returns certain data according to one or more query predicates that indicate what information should be returned by the query. The database system extracts specific data from the database and formats that data into a readable form.

Queries can be executed against database data to find certain data within the database. A database query extracts data from the database and formats it into a readable form.

For example, when a user wants data from a database, the user may write a query in a query language supported by the database. The query may request specific information from the database. The query may request any pertinent information that is stored within the database. If the appropriate data can be found to respond to the query, the database has the potential to reveal complex trends and activities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
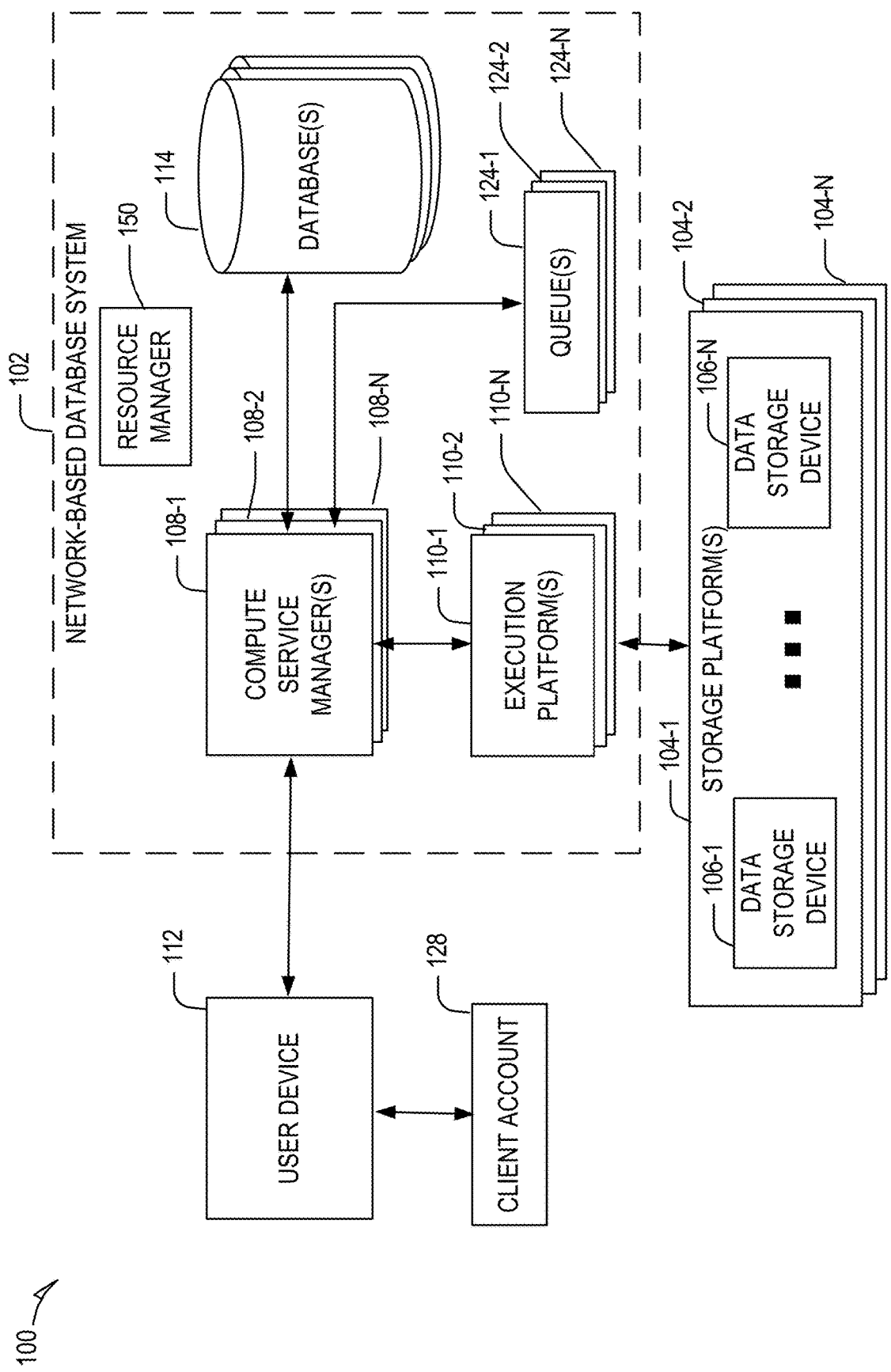
FIG. 1 illustrates an example computing environment that includes a network-based database system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may have a need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can only be harnessed through the use of a successfully executed query.

The systems, methods, and devices described herein provide embodiments for scheduling and executing tasks on shared storage and execution platforms. The systems, methods, and devices described herein may be implemented on network-based database platforms. Further, the implementations described herein enable queries to be executed on behalf of a client account.

FIG. 1 illustrates an example computing environment 100 that includes a network-based database system 102 in communication with a storage platform 104-1, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

In some embodiments, the network-based database system 102 includes compute service manager 108-1 to compute service manager 108-N, each of which can be in communication with one or more of queue 124-1 to queue 124-N, a client account 128, database(s) 114, and execution platform 110-1 to execution platform 110-N. In embodiments, each execution platform can correspond to a given (or different) cloud service provider (e.g., AWS®, Google Cloud Platform®, Microsoft Azure®, and the like).

In an embodiment, a compute service manager (e.g., any of the compute service managers shown in FIG. 1) does not receive any direct communications from a client account 128 and only receives communications concerning jobs from the queue. In particular implementations, a compute service manager can support any number of client accounts 128 such as end users corresponding to respective one or more of user device 112 that provide data storage and retrieval requests, system administrators managing the systems and methods described herein, and other components/devices that interact with the compute service manager. As used herein, a compute service manager may also be referred to as a "global services system" that performs various functions as discussed herein, and each of compute service manager 108-1 to compute service manager 108-N can correspond to a particular cluster (or clusters) of computing resources as described further herein.

Thus it is appreciated that embodiments of the subject technology can provide multiple instances of the aforementioned components, where each instance of a compute service manager can also utilize different instances of an execution platform, database, or queue. In particular, it is appreciated that the network-based database system 102 provides different instances of components to enable different versions of databases or execution platforms to be utilized by a given compute service manager, ensuring further flexibility to perform operations in connection with executing queries (e.g., received from client account 128 associated with user device 112). For example, a particular query can be compatible with a particular version of a database or execution platform, and it can be imperative that a given compute service manager facilitate execution of such a query to that particular of the database or execution platform as provided by the network-based database system 102.

As shown, the computing environment 100 comprises the network-based database system 102 and a storage platform 104 (e.g., AWS®, Microsoft Azure Blob Storage®, or Google Cloud Storage®). The network-based database system 102 is used for accessing and/or processing integrated data from one or more disparate sources including data storage devices 106-1 to 106-N within the storage platform 104. The storage platform 104 comprises a plurality of computing machines and provides on-demand computer system resources such as data storage and computing power to the network-based database system 102.

The network-based database system 102 includes one or more compute service managers, execution platforms, and databases. The network-based database system 102 hosts and provides database services to multiple client accounts. Administrative users can create and manage identities (e.g., users, roles, and groups) and use permissions to allow or deny access to the identities to resources and services.

Each compute service manager (e.g., any of the compute service managers shown in FIG. 1) coordinates and manages operations of the network-based database system 102. The compute service manager also performs query optimization and compilation as well as managing clusters of computing services that provide compute resources (also referred to as "virtual warehouses"). The compute service manager can support any number of client accounts such as end users providing data storage and retrieval requests, system administrators managing the systems and methods described herein, and other components/devices that interact with compute service manager 108-1.

The compute service manager (e.g., any of the compute service managers shown in FIG. 1) is also in communication with a user device 112. The user device 112 corresponds to a user of one of the multiple client accounts supported by the network-based database system 102. As shown, the user is associated with a client account 128. In some embodiments, the compute service manager 108-1 does not receive any direct communications from the user device 112 and only receives communications concerning jobs from a queue 124-1 within the network-based database system 102.

The compute service manager is also coupled to one or more database 114, which is associated with the data stored in the computing environment 100. The database 114 stores data pertaining to various functions and aspects associated with the network-based database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

In embodiments, the compute service manager is also coupled to one or more metadata databases that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager scans the table to find the information requested by the query. The table may include millions and millions of rows, and it would be very time consuming and it would require significant computing resources for the compute service manager to scan the entire table. The micro-partition organization along with the systems, methods, and devices for database metadata storage of the subject technology provide significant benefits by at least shortening the query response time and reducing the amount of computing resources that are required for responding to the query.

The compute service manager may find the cells of database data by scanning database metadata. The multiple level database metadata of the subject technology enables the compute service manager to quickly and efficiently find the correct data to respond to the query. The compute service manager may find the correct table by scanning table metadata across all the multiple tables in a given database. The compute service manager may find a correct grouping of micro-partitions by scanning multiple grouping expression properties across the identified table. Such grouping expression properties include information about database data stored in each of the micro-partitions within the grouping.

The compute service manager may find a correct micro-partition by scanning multiple micro-partition expression properties within the identified grouping of micro-partitions. The compute service manager may find a correct column by scanning one or more column expression properties within the identified micro-partition. The compute service manager may find the correct row(s) by scanning the identified column within the identified micro-partition. The compute service manager may scan the grouping expression properties to find groupings that have data based on the query. The compute service manager reads the micro-partition expression properties for that grouping to find one or more individual micro-partitions based on the query. The compute service manager reads column expression properties within each of the identified individual micro-partitions. The compute service manager scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

In some embodiments, the compute service manager may determine that a job should be performed based on data from the database 114. In such embodiments, the compute service manager may scan the data and determine that a job should be performed to improve data organization or database performance. For example, the compute service manager may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager may determine that a job should be performed. In some embodiments, the compute service manager determines that a job should be performed based on a trigger event and stores the job in a queue until the compute service manager is ready to schedule and manage the execution of the job. In an embodiment of the disclosure, the compute service manager determines whether a table or pruning index needs to be reclustered based on one or more DML commands being performed, wherein one or more of DML commands constitute the trigger event.

The compute service manager may receive rules or parameters from the client account 128 and such rules or parameters may guide the compute service manager in scheduling and managing internal jobs. The client account 128 may indicate that internal jobs should only be executed at certain times or should only utilize a set maximum amount of processing resources. The client account 128 may further indicate one or more trigger events that should prompt the compute service manager to determine that a job should be performed. The client account 128 may provide parameters concerning how many times a task may be re-executed and/or when the task should be re-executed.

The compute service manager is in communication with one or more queue 124-1. In an embodiment, the compute service manager does not receive any direct communications from a client account 128 and only receives communications concerning jobs from the queue 124-1. In particular implementations, the compute service manager can support any number of client accounts 128 such as end users providing data storage and retrieval requests, system administrators managing the systems and methods described herein, and other components/devices that interact with compute service manager.

The queue 124-1 may provide a job to the compute service manager. One or more jobs may be stored in the queue 124-1 in an order of receipt and/or an order of priority, and each of those one or more jobs may be communicated to the compute service manager to be scheduled and executed.

In an implementation, the queue 124-1 may determine a job to be performed based on a trigger event such as the ingestion of data, deleting one or more rows in a table, updating one or more rows in a table, a materialized view becoming stale with respect to its source table, a table reaching a predefined clustering threshold indicating the table should be reclustered, and so forth.

The queue 124-1 may determine internal jobs that should be performed to improve the performance of the database and/or to improve the organization of database data. In an embodiment, the queue 124-1 does not store queries to be executed for a client account but instead only stores database jobs that improve database performance.

A compute service manager is further coupled to an execution platform (e.g., one of execution platform 110-1, execution platform 110-2, execution platform 110-N), which provides multiple computing resources that execute various data storage and data retrieval tasks. The execution platform is coupled to one of a storage platform (e.g., storage platform 104-1, storage platform 104-2, storage platform 104-N). The storage platform 104-1 comprises multiple data storage devices 106-1 to 106-N, and each other storage platform can also include multiple data storage devices. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, AMAZON S3 storage systems or any other data storage technology. Additionally, the storage platform 104 may include distributed file systems (such as Hadoop Distributed File Systems (HDFS)), object storage systems, and the like. Similarly, any of the data storage devices in other storage platforms can also have similar characteristics described above in connection with storage platform 104-1.

The execution platform (e.g., any of the execution platforms shown in FIG. 1) comprises a plurality of compute nodes. A set of processes on a compute node executes a query plan compiled by the compute service manager. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108-1; a fourth process to establish communication with the compute service manager 108-1 after a system boot; and a fifth process to handle all communication with a compute cluster for a given job provided by the compute service manager 108-1 and to communicate information back to the compute service manager 108-1 and other compute nodes of the execution platform.

A relational join is a data processing operation in a relational data management system. For example, a join is a binary operator, taking two relations R and S, and a binary predicate θ as inputs, and producing a single relation which contains the set of all combinations of tuples in R and S which satisfy the predicate θ.

In an example, a single query can performs multiple join operations (among other types of operations), and a tree-shaped (or tree structure) execution plan (e.g., a query plan) can be generated to represent the query where such a query plan includes a set of nodes corresponding to various operations that are performed during query execution. For illustration, join operations can form intermediate nodes and group nodes of the tree structure representing the query plan, while base relations form analogous leaves of that tree structure of the query plan. Data flows from the leaves of the tree structure towards the root, where the final query result is produced.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110-1. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Each of compute service manager, database, execution platform, and storage platform shown in FIG. 1 may be implemented as a distributed system (e.g., distributed across multiple systems/platforms at multiple geographic locations). Additionally, each of the compute service manager, database, execution platform, and storage platform can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by a compute service manager. These jobs are scheduled and managed by the compute service manager to determine when and how to execute the job. For example, the compute service manager may divide the job into multiple discrete tasks and may determine what data is needed to execute each of the multiple discrete tasks. The compute service manager may assign each of the multiple discrete tasks to one or more nodes of an execution platform to process the task. The compute service manager 108-1 may determine what data is needed to process a task and further determine which nodes within the execution platform 110-1 are best suited to process the task. Some nodes may have already cached the data needed to process the task and, therefore, be a good candidate for processing the task. Metadata stored in the database 114 assists the compute service manager in determining which nodes in the execution platform have already cached at least a portion of the data needed to process the task. One or more nodes in the execution platform process the task using data cached by the nodes and, if necessary, data retrieved from the storage platform. It is desirable to retrieve as much data as possible from caches within the execution platform because the retrieval speed is typically much faster than retrieving data from the storage platform.

As shown in FIG. 1, the computing environment 100 separates the execution platforms from the storage platforms. In this arrangement, the processing resources and cache resources in the execution platforms operate independently of the data storage devices in the storage platforms. Thus, the computing resources and cache resources are not restricted to specific data storage devices. Instead, all computing resources and all cache resources may retrieve data from, and store data to, any of the data storage resources in the storage platform.

As described further herein, a resource manager 150 can perform load balancing operation in connection with availability zones ("AZ" as mentioned further herein) including different clusters of instances of compute service managers with varying computing resources (e.g., different virtual warehouses, and the like).

Figure 2:
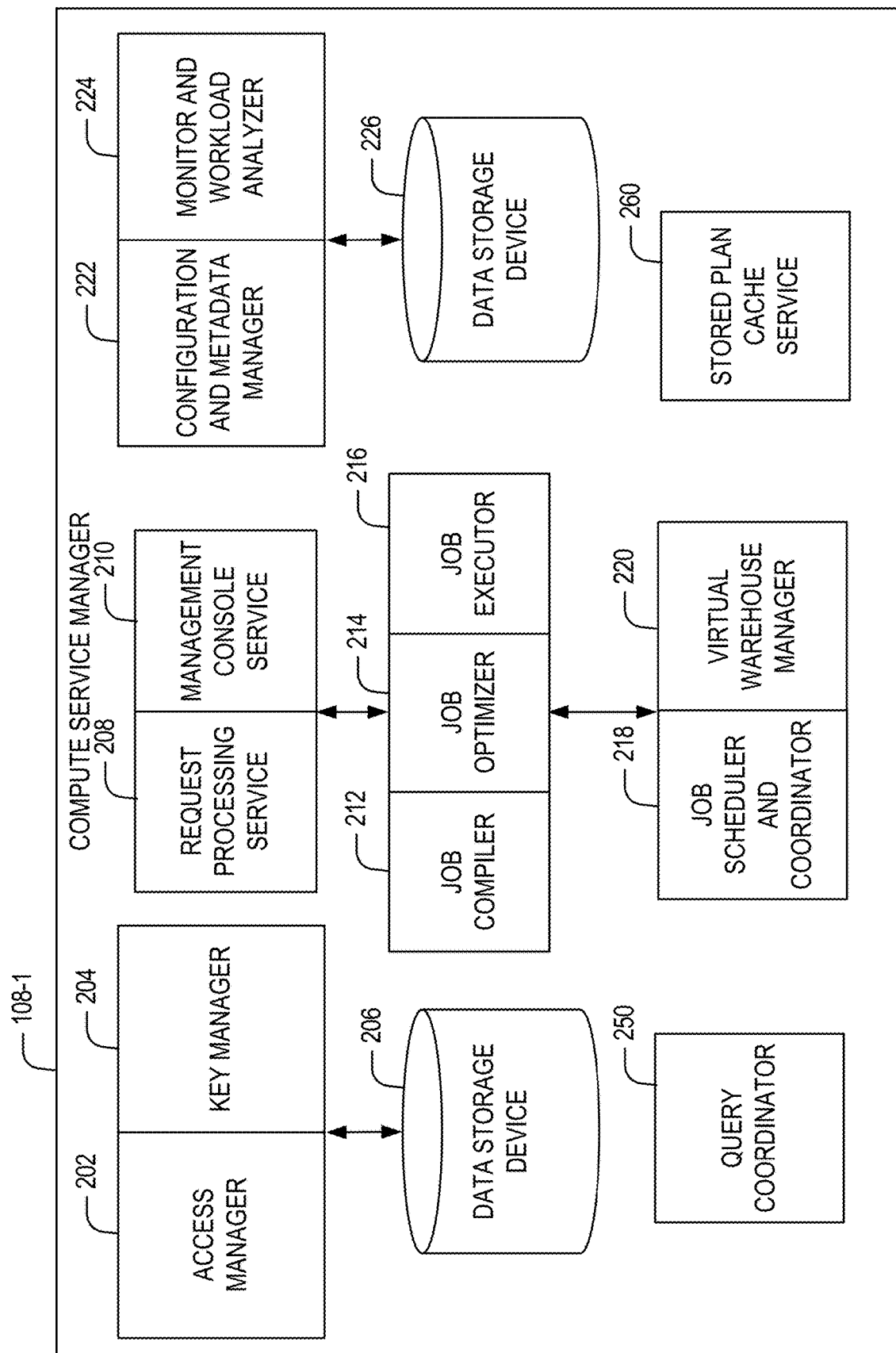
FIG. 2 is a block diagram illustrating components of a compute service manager, in accordance with some embodiments of the present disclosure.

FIG. 2 is a block diagram illustrating components of the compute service manager 108-1, in accordance with some embodiments of the present disclosure. As shown in FIG. 2, the compute service manager 108-1 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104-1). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110-1 or in a data storage device in storage platform 104-1.

A management console service 210 supports access to various systems and processes by administrators and other system managers. Additionally, the management console service 210 may receive a request to execute a job and monitor the workload on the system.

The compute service manager 108-1 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108-1.

A job scheduler and coordinator 218 sends received jobs to the appropriate services or systems for compilation, optimization, and dispatch to the execution platform 110-1. For example, jobs may be prioritized and processed in that prioritized order. In an embodiment, the job scheduler and coordinator 218 determines a priority for internal jobs that are scheduled by the compute service manager 108-1 with other "outside" jobs such as user queries that may be scheduled by other systems in the database but may utilize the same processing resources in the execution platform 110-1. In some embodiments, the job scheduler and coordinator 218 identifies or assigns particular nodes in the execution platform 110-1 to process particular tasks. A virtual warehouse manager 220 manages the operation of multiple virtual warehouses implemented in the execution platform 110-1. As discussed below, each virtual warehouse includes multiple execution nodes that each include a cache and a processor.

Additionally, the compute service manager 108-1 includes a configuration and metadata manager 222, which manages the information related to the data stored in the remote data storage devices and in the local caches (e.g., the caches in execution platform 110-1). The configuration and metadata manager 222 uses the metadata to determine which data micro-partitions need to be accessed to retrieve data for processing a particular task or job. A monitor and workload analyzer 224 oversee processes performed by the compute service manager 108-1 and manages the distribution of tasks (e.g., workload) across the virtual warehouses and execution nodes in the execution platform 110-1. The monitor and workload analyzer 224 also redistribute tasks, as needed, based on changing workloads throughout the network-based database system 102 and may further redistribute tasks based on a user (e.g., "external") query workload that may also be processed by the execution platform 110-1. The configuration and metadata manager 222 and the monitor and workload analyzer 224 are coupled to a data storage device 226. Data storage device 226 in FIG. 2 represent any data storage device within the network-based database system 102. For example, data storage device 226 may represent caches in execution platform 110-1, storage devices in storage platform 104-1, or any other storage device.

In an example, a large source table may be (logically) organized as a set of regions in which each region can be further organized into a set of micro-partitions. Additionally, each micro-partition can be stored as a respective file in the subject system in an embodiment. Thus, the term "file" (or "data file") as mentioned herein can refer to a micro-partition or object for storing data in a storage device or storage platform (e.g., at least one storage platform from storage platforms 104-1 to 104-N). In embodiments herein, each file includes data, which can be further compressed (e.g., using an appropriate data compression algorithm or technique) to reduce a respective size of such a file. For example, as discussed further herein, due to fragmentation, some data corresponding to a set of rows in a given file may be empty or sparsely populated, and compression of such rows can yield a smaller size of the file.

In some instances, fragmentation can occur at a table level where data (e.g., corresponding to a set of rows in a given source table) are stored across different micro-partitions or files associated with a given table. In comparison, when there is no fragmentation (or a low amount of fragmentation), the same set of rows are stored in a same partition or file associated with the table. It is appreciated that even in a source table with low fragmentation (e.g., based on a threshold number of rows), there can be multiple files associated with the table. Consolidated rows may also not be stored in one file, and can be stored in fewer files than where such rows were stored prior to consolidation.

In other examples, over time, modifying data can cause data fragmentation where files (or micro-partitions) are undersized or sparsely populated. As mentioned herein, each partition can correspond to a set of rows in a given source table, and a fragmented partition refers to a particular partition with one or more rows that are empty such that the source table is not as populated with data.

In some embodiments, metadata may be generated when changes are made to one or more source table(s) using a data manipulation language (DML), where such changes can be made by way of a DML statement. Examples of modifying data, using a given DML statement, may include updating, changing, merging, inserting, and deleting data into a source table(s), file(s), or micro-partition(s). Also, when multiple tables are selected from (e.g., as part of a DML statement) into another table, the target table of such a DML statement could suffer from fragmentation.

Although the above discussion and examples are related to compute service manager 108-1, in some embodiments, similar or the same components are included in each of the compute service managers shown in FIG. 1.

As further illustrated, compute service manager 108-1 includes a query coordinator 250 and dedicated stored query plan service 260. In embodiments, query coordinator 250 performs operations for plan cache lookup of stored query plans to enable accessing stored query plans (e.g., to avoid compilation and increase performance of query execution). Stored plan cache service 260 enables storing plan cache entries that then enable sharing of such among different compute service manager instances (e.g., compute service manager 108-2 to compute service manager 108-N). The query coordinator 250 and stored plan cache service 260 are described in more detail in FIG. 4 below.

Figure 3:
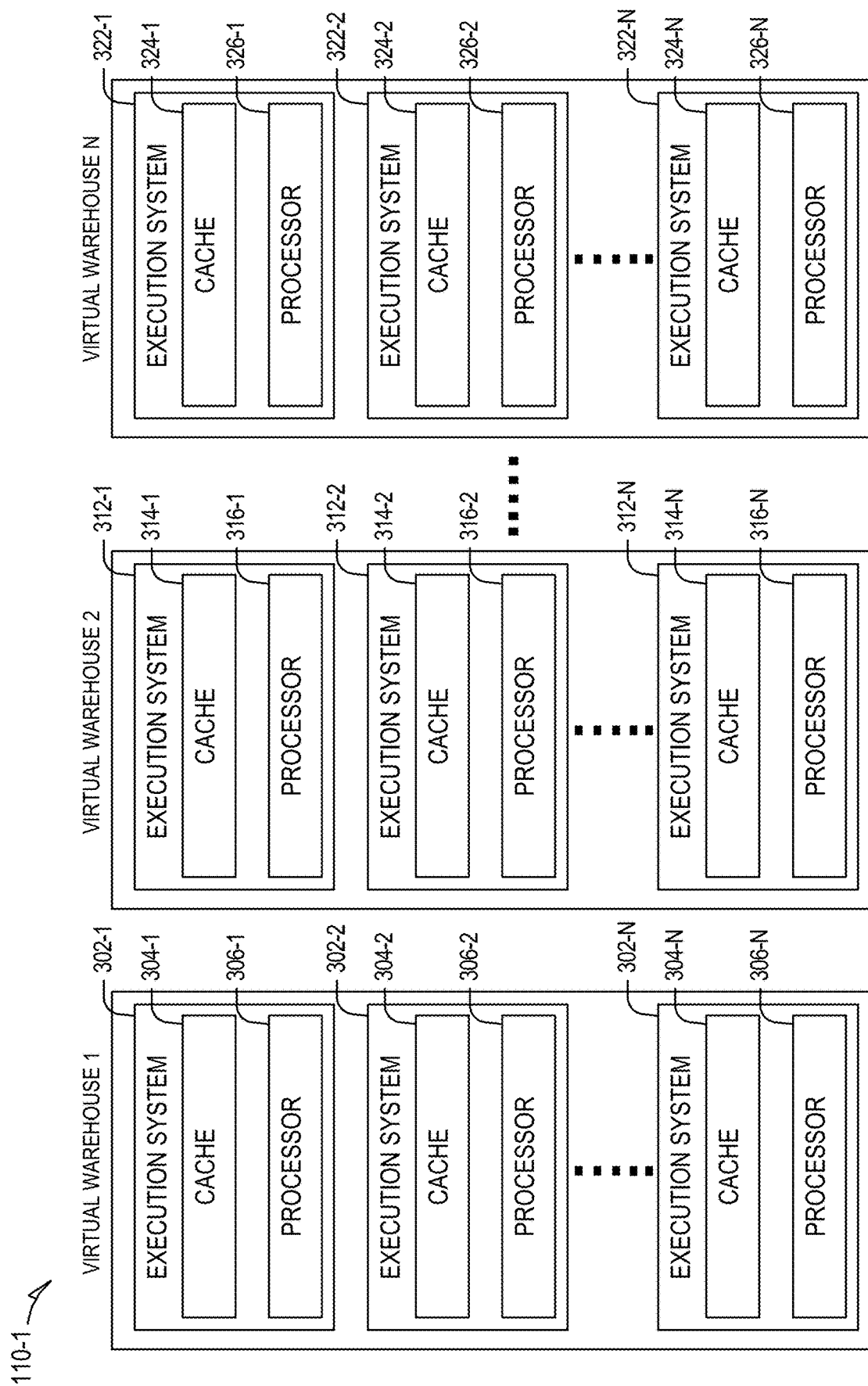
FIG. 3 is a block diagram illustrating components of an execution platform, in accordance with some embodiments of the present disclosure.

FIG. 3 is a block diagram illustrating components of the execution platform 110-1, in accordance with some embodiments of the present disclosure. As shown in FIG. 3, the execution platform 110-1 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110-1 can add new virtual warehouses and drop existing virtual warehouses in real-time based on the current processing needs of the systems and users. This flexibility allows the execution platform 110-1 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110-1, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110-1 is also fault tolerant. For example, if one virtual warehouse fails, that virtual warehouse is quickly replaced with a different virtual warehouse at a different geographic location.

A particular execution platform 110-1 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Although the above discussion and examples are related to execution platform 110-1, in some embodiments, similar or the same components are included in each of the execution platforms shown in FIG. 1.

Embodiments of the subject technology provide caching for query plans through the use of a plan cache, enabling the storage of query plans (or "shared plans" or "stored plans" as referred to herein) which is described further herein. One objective of the plan cache is the use of pre-compiled plans to avoid the cost of compilation for a large number of recurring database (e.g., SQL) statements, which provides improvements for the functionality of a computer (e.g., the database system) by reducing the utilization of computing resources (e.g., processor, memory, network, and the like).

In an example, stored plans can essentially relax the sharing criteria used by a result cache to reuse a query plan compiled by a previous execution but without reusing the results themselves. In particular, stored plans provided by embodiments herein can avoid computationally expensive compilation of query plans when the underlying partitions have changed but the query is otherwise identical.

The following discussion relates to a (high level) system architecture and overview of plan cache lookup and register processes performed by components of the below described system architecture.

Figure 4:
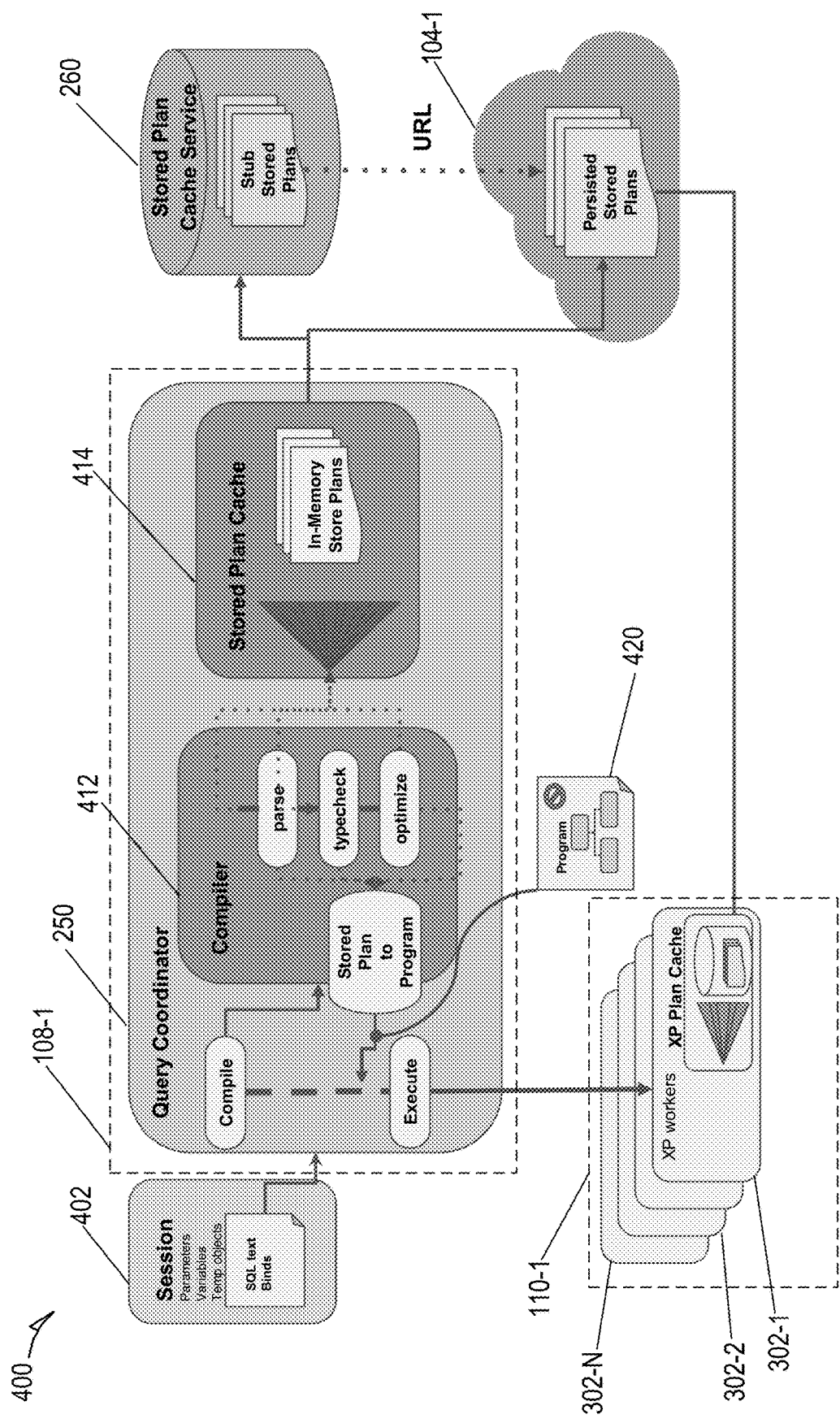
FIG. 4 is a block diagram depicting an example system architecture of a database system, in accordance with some embodiments of the present disclosure.

FIG. 4 is a block diagram depicting an example system architecture 400 of a database system, in accordance with some embodiments of the present disclosure. As illustrated, system architecture 400 includes components discussed before, including, for example, execution nodes from the execution platform 110-1, storage platform 104-1, and query coordinator 250.

As illustrated, a query (e.g., SQL statement(s)) is received from a user and binds from a session 402 (e.g., a connected session). Query coordinator 250, in an example, performs operations to populate a compilation context and invoke a compiler 412 to generate a program 420. The compilation context, for example, refers to a set of information or data including SQL text (e.g., one or more SQL statements), a bind variable(s), and a reference to the session 402 that are provided to compiler 412 to utilize during a compilation process (e.g., to generate program 420 which can be executed by a given execution node). A bind variable refers to a placeholder in a SQL statement that is replaced with a valid value or value address for the statement to execute and therefore enables the SQL statement to receive inputs or parameters during query execution.

In an implementation, program 420 is a read-only immutable program based at least in part on a query plan. In the example of FIG. 4, program 420 can be provided to one of execution node 302-1, execution node 302-2, or execution node 302-N for execution.

Compiler 412 performs operations to lookup a matching query plan in a stored plan cache 414. In an implementation, stored plan cache 414 is a local cache in memory (e.g., locally accessible by compute service manager 108-1 and not stored remotely on a cloud platform) and stores a set of stored plans in memory. In an implementation, compiler 412 can be implemented as part of query coordinator 250. Alternatively, compiler 412 can be implemented as a separate component (e.g., job compiler 212).

A set of files (or micro-partitions) to scan in executing a query may be referred to herein as a "scanset".

When an exact match is found, query coordinator 250 can perform the following operations (e.g., in conjunction with compiler 412 for some):

Check if the plan requires re-compilation due to data dependent optimization
Validate the stored plan
Check plan staleness (e.g., stale plan detection)
Compute a scanset(s) applying new pruning (if any)
Generate program (e.g., compiled query plan) based on the stored plan and the scanset(s)

As discussion of examples of data dependent optimization(s), stored plan validation, checking plan staleness, and computing the scanset(s) are included further below.

When an exact match is not found, query coordinator 250 can perform the following operations (e.g., in conjunction with compiler 412 for some):

Parse a statement(s) from the query and generate a set of tokens
Perform lookup in stored plan cache 414 for a match with a normalized statement (e.g., auto-parameterization)

When an approximate match is found, query coordinator 250 can perform the following operations (e.g., in conjunction with compiler 412 for some):

Check if the plan requires re-compilation due to data dependent optimization
Validate the stored plan
Check plan staleness (e.g., stale plan detection)
Compute a scanset(s) applying new pruning (if any)
Generate program (e.g., compiled query plan) based on the stored plan and the scanset(s)

When an approximate match is not found, query coordinator 250 can perform the following operations (e.g., in conjunction with compiler 412 for some):

Perform full compilation
Generate a compiled query plan (e.g., a stored plan) and store it in stored plan cache 414 (e.g., local in-memory cache)
Generate a program (e.g., program 420) based on the stored plan
Initiate an offline process to persist the stored plan to blob storage (e.g., storage platform 104-1) and store a stub for the stored plan in stored plan cache service 260

The following discussion relates to data dependent optimization as mentioned before.

The compiler (e.g., compiler 412) leverages a set of properties of data at a current transaction snapshot (e.g., representing a current state of such properties during the current transaction) to produce the optimized plan. In an example, such properties include the number of rows in the table, number of rows in the table after pruning with local filters, accessed files, and value distribution of a column.

Data dependent optimization is powerful but when it comes to caching a query plan for reuse, this becomes a challenge because if data properties are broken, the query plan is no longer valid.

The subject technology helps reduce the compilation time by caching and sharing previously compiled plan(s) without losing the benefit of data dependent optimization.

The following are examples of data dependent optimizations:

RowGenerator for Constant Projections
Original query: Select 1 from t1
Data property: number of rows in table t1
Rewritten query: Select 1 from rowGenerator(<num of rows in table t1>)
If the projections are constants, table scan can be replaced by a row generator that generates the dummy rows equals to the number of the original table.

Expression Constant Folding
Original query: select col0 from t1
Data property: column t1.col0 only contains a single value, for example 'a'
Rewritten query: select 'a' from t1
If the column contains a single value at a given snapshot, the column reference in the query can be replaced by the constant. This can lead to additional optimization such as replacing table scans with row generators.

Predicate Folding
Original query: select * from t1 where col0>0 Data property: all values of col0 is greater than 0
Rewritten query: select * from t1

Expression Constant Folding after Pruning
Original query: select col1 from t1 where col0>0
Data property: column t1.col1 only contains a single value, for example 'b', after pruning the base table files with predicate col0>0
Rewritten query: select 'b' from t1 where col0>0

Join Elimination
Original query: select t1.* from t1 left outer join t2 on t1.col0=t2.col0
Data property: range of t1.col0 and t2.col0 does not overlap
Rewritten query: select * from t1
By looking at the data ranges of the join keys, if there are no matching rows, the join can be eliminated.

Physical Data Type Optimization
Original query: Select a from t1 where b>0 and t>'2021-07-22'
Data property: all values of column 'a' fits into 1 byte (−128<=a<=127)
Rewritten query: Select a(SB1) from t1 where b>0 and t>'2021-07-22'
SB1 is to represent a numeric column that can fit into 1 byte.

The execution data type of column 'a' is determined as 'SB1' which represents the numeric data type that can fit into 1 byte. Regardless of the actual storage data type of column 'a', the query execution plan can be optimized to use less space to store intermediate data of column 'a'. This reduces the memory requirements for the execution and also the time required for memory allocation calls.

The following discussion relates to plan validation to check data properties.

The plan that utilized a data dependent optimization can be still valid after that point in time as long as the data properties used for the data dependent optimization still holds. For example, if the query 'select col0 from t1' was rewritten to 'select 'a' from t1' because the column t1.col0 only contains a single value, for example 'a', the rewritten plan 'select 'a' from t1' can be used until there was an INSERT or UPDATE statement that puts a value different from 'a' into the t1.col0 column. The query plan and data properties that need to be validated are stored in order to check if the plan is still reusable at the point of plan cache lookup.

The following is an example process for the above:
1. During the first compilation of the query, whenever a data dependent optimization was performed, record the data property used for that optimization.
2. After the query compilation, store the optimized plan together with the data property in the plan cache.
3. When the new query comes in, see if there is a matching entry in the plan cache.
4. See if the plan cache entry has any data property constraint.
5. Compute the data properties of the current snapshot.
6. check if the constraints still hold.
   a. If this check fails, the plan cache entry is invalidated and the query is recompiled.
   b. If this check passes, reuse the stored plan.

In some instances, step 5 above can be costly, if the data property computation requires a lot of metadata access or involves complex computations, or if there are a lot of data properties to be checked. The data property constraints can be lifted using plan generalization described in the next section.

Figure 5:
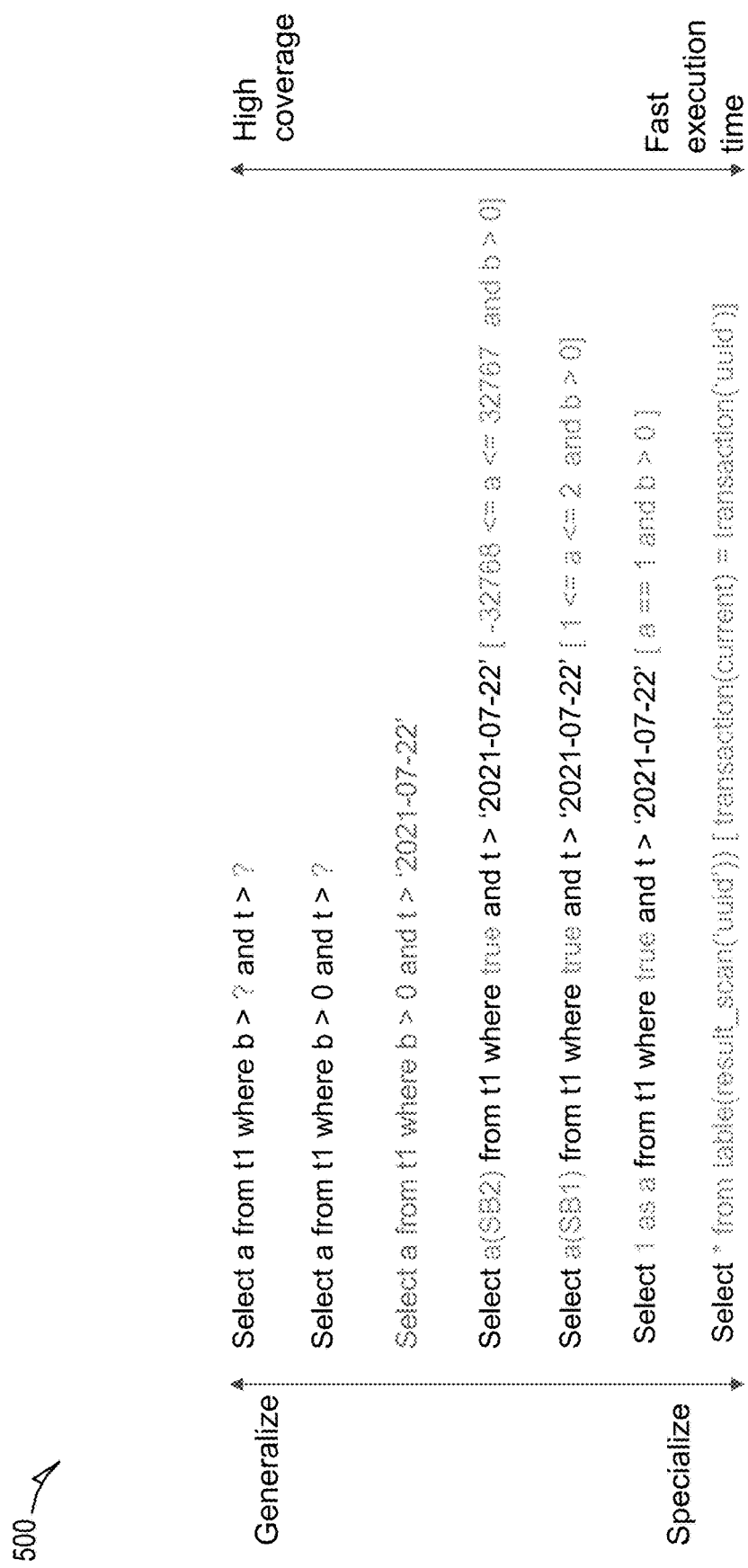
FIG. 5 is a diagram depicting an example of a compilation process with data dependent optimization(s) that can be understood as a plan specialization process, in accordance with some embodiments of the present disclosure.

FIG. 5 is a diagram depicting an example of a compilation process 500 with data dependent optimization(s) that can be understood as a plan specialization process, in accordance with some embodiments of the present disclosure.

As shown, the compilation process 500 includes various SELECT statements that can be included in a given query plan where the various statements can range from more general scope to more specialized scope which correspond to high coverage to fast execution time.

Given an example query 'select a from t1 where b>0 and t>'2021-07-22'', the more the subject technology utilizes specific data properties the plan is fine-tuned to the current data snapshot. However, this makes it more difficult to be reused and decreases the plan cache hit ratio. The extreme end of the specialization is caching the query result itself (the bottom-most query in the picture above), which will only be reusable when there are no underlying data changes.

The next level shows the query rewritten to 'select 1 as a from t1 where true and t>'2021-07-22'' which is valid until the properties 'a==1 and b>0' holds. However, the property 'a—1' may be too restrictive, since inserting any value other than '1' will invalidate the plan. If the estimated benefit of this data optimization is not greater than the benefit of using the shared plan, the subject technology can choose not to perform this data dependent optimization. Disabling the optimization for column 'a' will generalize the plan to 'select a from t1 where true and t>'2021-07-22'', with constraints 'b>0'. Although this generalized plan may be less optimal, it has a less restrictive constraint, and can increase the plan utilization.

The subject technology can decide the amount of generalization that is performed by deciding the range of an expression property (EP). The 4th and the 5th query in FIG. 5 illustrates examples in deciding the range of the expression property. Depending on the EP range of the column a ([−32768<=a<=32767] for the 4th query, [1<=a<=2] for the 5th query) the plan has different levels of optimization. The 5th plan is using SB1 type for processing column 'a' which means it will allocate 1 byte for the values of column 'a', whereas the 4th plan is using SB2, using 2 bytes for each value. The 5th plan is more optimized in the sense that it uses less memory and will likely have less memory allocation overhead, but it will be invalidated more often if the values of column 'a' exceeds the range.

The subject technology can choose to use a wider range of EP instead of the actual one to control the level of generalization, which is called EP approximation. Another reason to use a generalized plan is to reduce the overhead of checking the constraints during plan cache lookup. Taking the example from the expression constant folding after pruning mentioned above, the original query 'select col1 from t1 where col0>0' can be optimized to 'select 'b' from t1 where col0>0', using the data property 'column t1.col1 only contains a single value, for example 'b', after pruning the base table files with predicate col0>0'. To check if the property still holds, the subject technology performs a full pruning on table 't1' with predicate 'col0>0'. The min/max range or the distinct value count of the column col1 is then computed to see if the column col1 contains a single value. In some instances, this is a costly operation that involves substantial metadata lookup and computation, to be done each time a lookup is performed for the plan cache entry. To avoid such overhead, the subject technology can choose not to perform the optimization to replace t1.col1 to 'b' if the estimated benefit is not higher than the benefit of generalization.

The following discussion relates to plan de-generalization.

Figure 6:
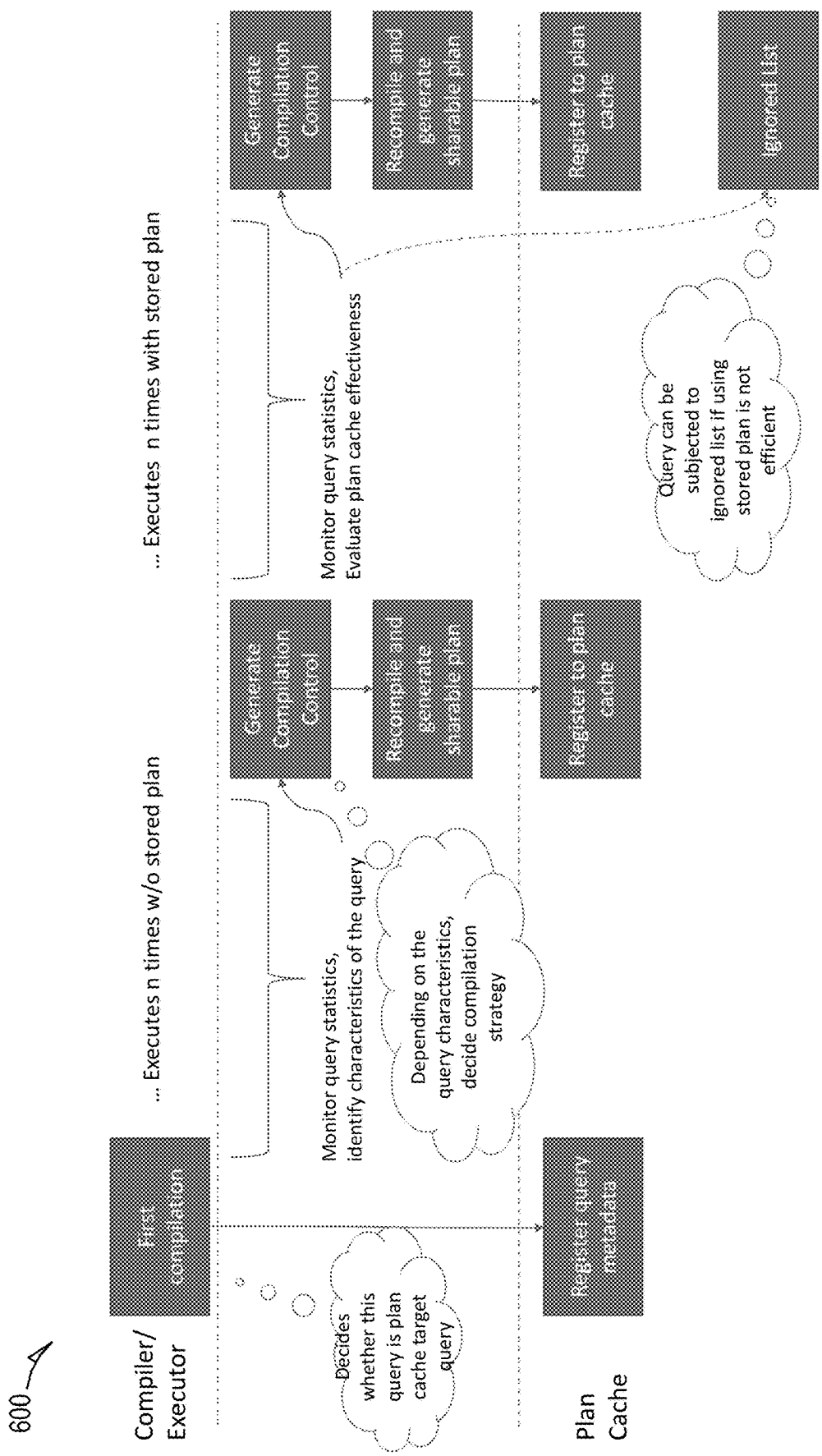
FIG. 6 is a diagram depicting an example of a set of operations illustrating a lifecycle of a query plan, in accordance with some embodiments of the present disclosure.

FIG. 6 is a diagram depicting an example of a set of operations 600 illustrating a lifecycle of a query plan, in accordance with some embodiments of the present disclosure.

In some examples, the plan generalization decision can be made after observing the workload. However, the estimation can be wrong, and it may turn out that the benefit of the data dependent optimization was underestimated, causing an overall slowdown of the average query performance. In this case, the subject technology can decide not to generalize the plan and go back to the previous behavior.

The following discussion relates to plan generalization.

Figure 7:
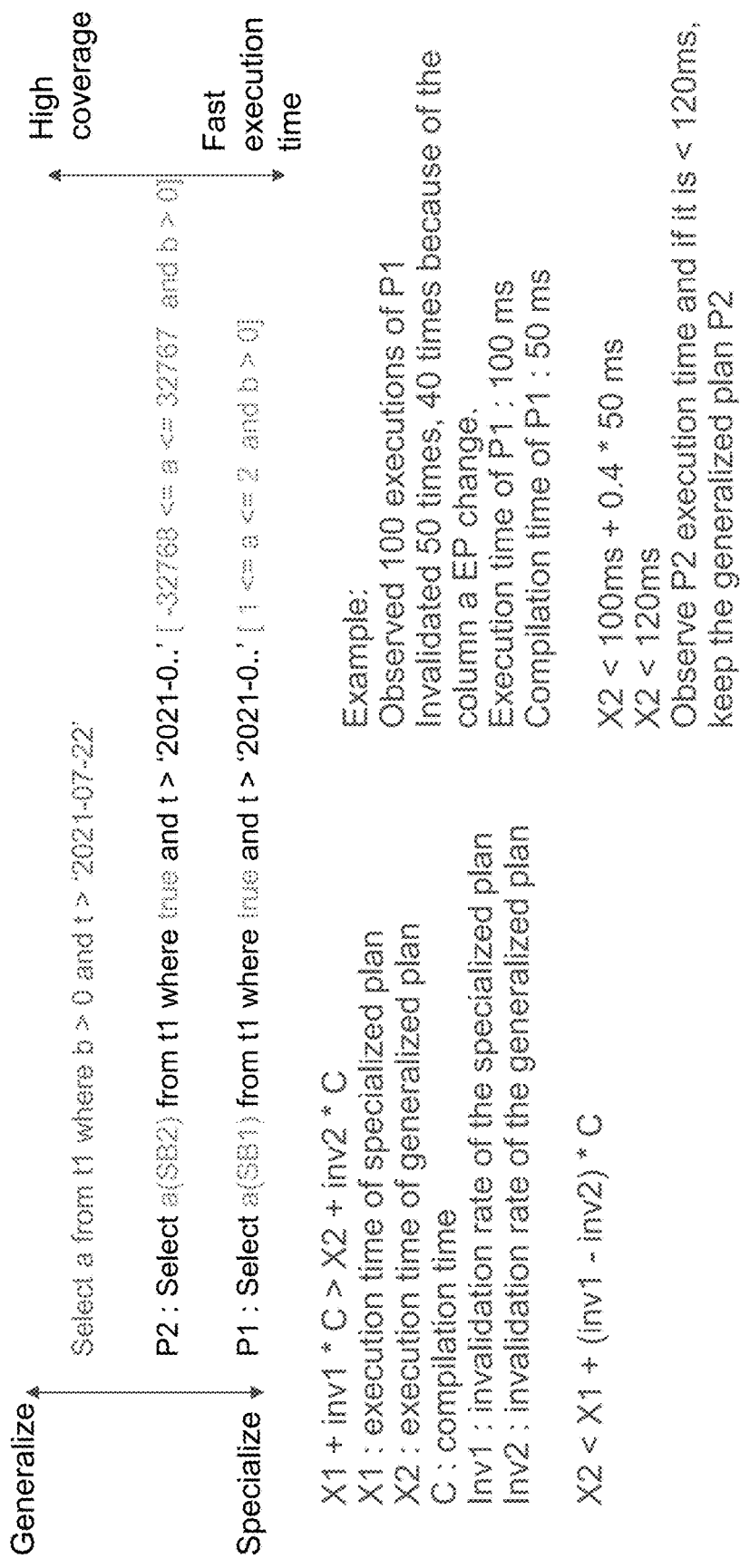
FIG. 7 is a diagram depicting an example of plan generalization, in accordance with some embodiments of the present disclosure.

FIG. 7 is a diagram 700 depicting an example of plan generalization, in accordance with some embodiments of the present disclosure.

As shown in FIG. 7, by observing the execution time, compilation time and cache utilization rate, the right level of generalization can be determined. Since the compilation time and execution time can change over time depending on the base table size, and also the cache utilization can change depending on the workload, this needs to be constantly monitored and the plan needs to be adjusted. This process can be done either eagerly (whenever the query is executed) or in the background with asynchronous manner in some implementations.

The following discussion relates to stored plan validation.

When a matching entry is found, the plan is validated, comparing the current context and the one at the point of the plan registration to guarantee correctness. If the validation fails, the invalidation logic takes place. Validation includes the following:

Consistency of the accessed objects. All referenced objects including tables, views, indexes, materialized views and UDFs are validated to check if they have any changes due to DMLs.

Roles and permissions to see if the current user has the proper permissions to execute the plan If the properties used to optimize the plan still holds, which was described above in the discussion of plan cache data dependent optimization handling If there was any change in the parameters that can affect the plan The following discussion relates to stale plan detection.

If there were many data changes after caching the plan, the subject technology invalidates the plan because recompiling the plan will likely generate a more optimal plan with more accurate size estimation. After identifying the partitions that have been deleted and added since the last execution, the subject technology computes the gap and if the gap exceeds a certain threshold, the subject technology invalidates the plan.

Even if the query plan is not stale because of the data changes, the plan can also be invalidated if there is a high chance of getting a better plan because of added bloom filters, secondary indexes and materialized views to the accessed objects.

The following discussion relates to scanset recomputation, which is performed in some instances.

In some instances, the files to be read in a current snapshot (e.g., in a scanset) has to be recomputed. Initially, an entire list of files are loaded using a current transaction version, followed by the pruning of the files using the pruners saved in plan cache entry during the first compilation. This file pruning can be done approximately and incrementally using previous execution information to reduce the scanset computation and pruning overhead. If the gap between the original scanset and the current scanset is too wide, the plan will be invalidated as recompiling the query may lead to a more optimized plan.

The following discussion relates to an approximate match with a normalized SQL statement.

Even if the exact SQL statement does not match any of the plan cache entries, there are still chances to find the matching entry by normalizing the SQL statement. Using a lightweight parser, the subject technology generates the normalized statement based on the following:

Remove white spaces and comments
Use fully qualified names of objects
Parameterize constants The following discussion relates to parameterized query handling/auto parameterization.

An additional improvement to increase the probability of sharing a given SQL statement, is to extract and factorize constants from this sequence. The compiler should parameterize the statement. Again, this would require parsing the SQL statement to identify constants to extract.

In an example:
SELECT count(*) FROM table WHERE column=10
is internally stored as the following:
SELECT COUNT(*) FROM TABLE WHERE COLUMN=:1
Where :1 is a reference to the extracted parameter of the query (10).

The subject technology should probably also do something for IN-LIST to make sure the subject technology can share more readily. For example:
SELECT count(*) FROM table WHERE column in (1, 4, 2, 7)
should be represented as the following:
SELECT count(*) FROM table WHERE column in :1
Where :1 is a reference to an array of values (1, 4, 2, 7)

Each plan cache entry can have multiple plans and to decide which plan to use is based on the range of the parameters. Plans can be categorized by using plan hash, and different parameter ranges that result in different shapes of plan are stored as separate branches within the same plan cache entry.

The following discussion relates to an in-memory stored plan cache and memory management.

Each compute service manager instance has its own in-memory stored plan cache which holds the stored plan metadata information and either the serialized plan or the handler to the serialized plan (location in blob storage e.g., storage platform 104-1).

The global memory size limit of the plan cache can be configured together with the policy to limit the number of entries and memory size for each account/user.

The in-memory cache can use an LRU based cache eviction mechanism but other properties such as the compilation time of the plan, execution time of the plan, customer workload pattern information and manual user settings may affect the cache management policy.

The following discussion relates to persisting stored plans.

If the size of the serialized plan exceeds a certain threshold, the plan will be off-loaded to blob storage (e.g., storage platform 104-1) that can be accessed both from a given compute service manager (e.g., compute service manager 108-1) and an execution node (e.g., one of execution node 302-1, execution node 302-2, or execution node 302-N). The plan cache will only hold the handler (e.g., location of the blob storage) of the plan, and pass this to an execution node for the execution. In some implementations, execution nodes have their own local cache that maps a plan ID to a serialized plan to reduce the blob storage access overhead.

The following discussion relates to a stored plan cache dedicated service.

Within a compute service manager cluster there will be dedicated instances that serve as a stored plan cache dedicated service, so that the plan cache entries are collected in the centralized space and shared among different compute service manager instances. The dedicated service implements fail over logic so that even if there is a fault in the instance it can be backed up by a newly promoted instance without losing its plan cache entries. The plan metadata in the dedicated service will be persisted for this purpose, and there will be a background cleaner to remove the plans when they are too old. During a version upgrade of a compute service manager cluster, the dedicated service will invalidate the plans when they are not compatible with the newer version, and may pre-warm the frequently accessed cache entry based on the statistics.

Figure 8:
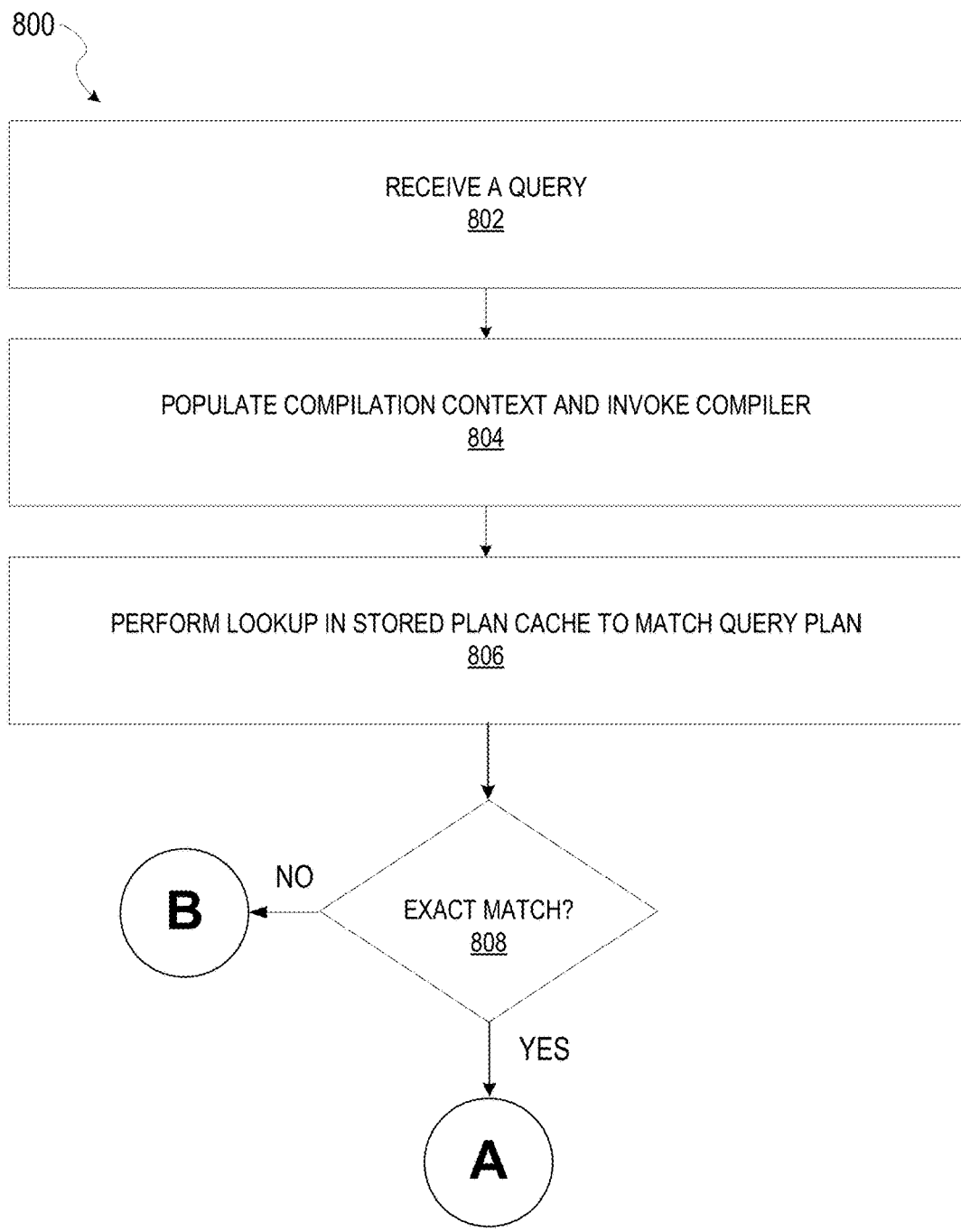
FIG. 8 is a flow diagram illustrating operations of a database system in performing a method, in accordance with some embodiments of the present disclosure.

FIG. 8 is a flow diagram illustrating operations of a database system in performing a method, in accordance with some embodiments of the present disclosure. The method 800 may be embodied in computer-readable instructions for execution by one or more hardware components (e.g., one or more processors) such that the operations of the method 800 may be performed by components of network-based database system 102. Accordingly, the method 800 is described below, by way of example with reference thereto. However, it shall be appreciated that method 800 may be deployed on various other hardware configurations and is not intended to be limited to deployment within the network-based database system 102.

At operation 802, query coordinator 250 receives a query, the query including a set of statements for performing the query.

At operation 804, query coordinator 250 populates a compilation context based at least in part the query. In an example, the compilation context includes text comprising a structured query language (SQL) statement, a bind variable, and a reference to a session. In an example, query coordinator 250 provides the compilation context to a compiler (e.g., compiler 412).

At operation 806, compiler 412 performs a lookup operation on a stored plan cache (e.g., stored plan cache 414) for an exact match based on information from the compilation context, the stored plan cache including a set of stored query plans.

At operation 808, compiler 412 determines whether the exact match of a particular query plan is found in the stored plan cache to avoid compiling the query using the compilation context. If the exact match is found, then additional operations are performed as discussed below in FIG. 9. Alternatively, if the exact match is not found, then additional operations are performed as discussed below in FIG. 10.

Figure 9:
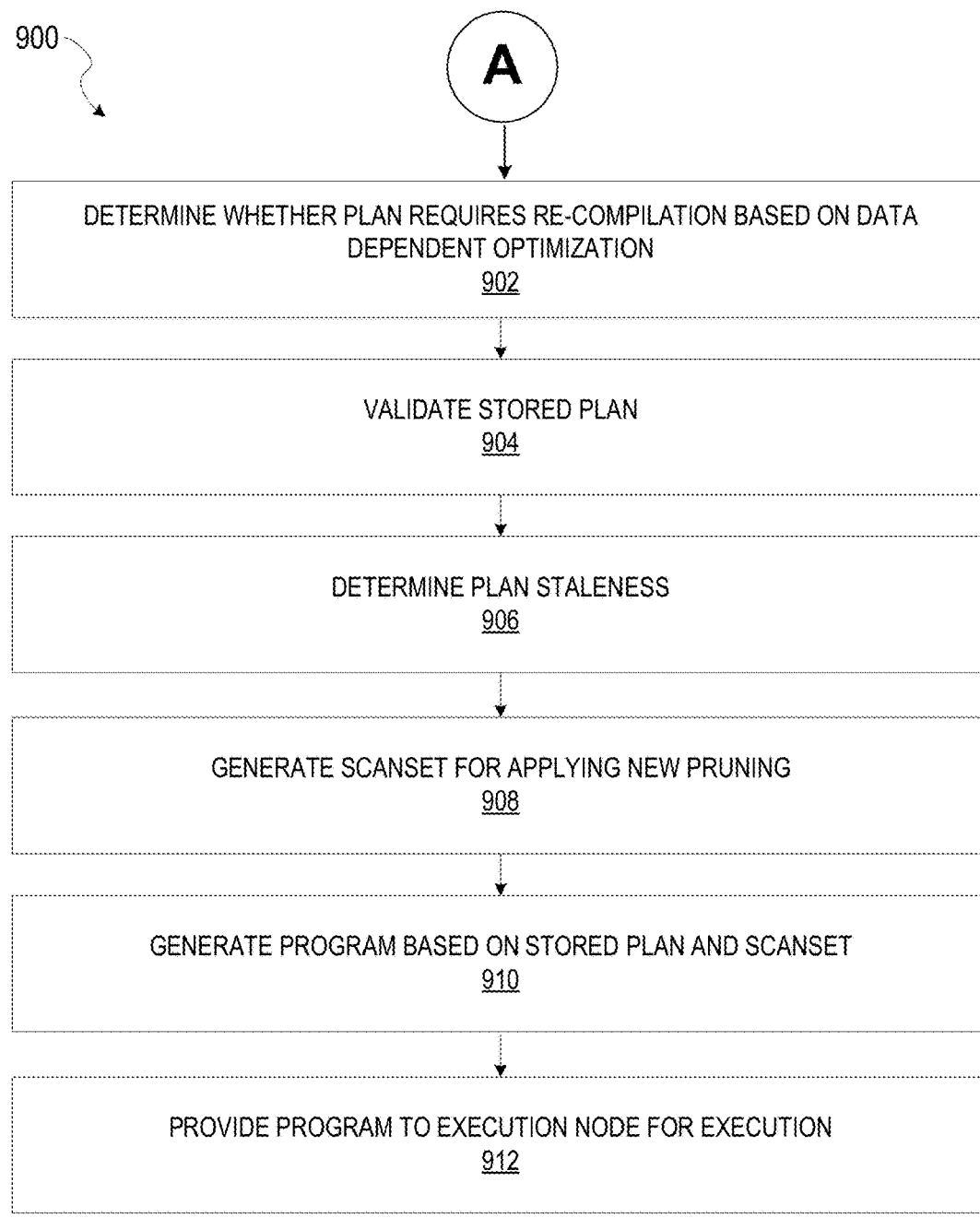
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102. Accordingly, the method 900 is described below, by way of example with reference thereto. However, it shall be appreciated that method 900 may be deployed on various other hardware configurations and is not intended to be limited to deployment within the network-based database system 102.

At operation 902, compiler 412, in response to determining an exact match (as discussed above in FIG. 8), determines whether the particular query plan requires re-compilation based on a data dependent optimization.

In embodiments, determining whether the particular query plan requires re-compilation based on the data dependent optimization comprises: compiler 412 determining whether a plan cache entry corresponding to the particular query plan includes a data property constraint, the data property constraint being utilized when the particular query plan was previously compiled and stored as part of the plan cache entry; determining a set of data properties based on current metadata associated with a set of source tables or files associated with the particular query plan; and determining whether the data property constraint still holds based on the set of data properties, wherein the data property constraint comprises a condition that is met based on a set of source tables or files associated with the particular query plan.

In embodiments, in response to the data property constraint not holding, compiler 412 invalidates the plan cache entry, and re-compiles the query based at least in part on the compilation context.

In embodiments, in response to the data property constraint holding, query coordinator 250 provides the particular query plan corresponding to the plan cache entry to an execution node for executing the query.

At operation 904, compiler 412, in response to the particular query plan not requiring re-compilation, validates the particular query plan.

At operation 906, compiler 412, in response to the particular query plan being validated, determines whether the particular query plan is stale.

At operation 908, compiler 412, in response to the particular query plan not being stale, generates a new scanset based at least in part on a set of files that were pruned during a previous compilation of the particular query plan.

At operation 910, compiler 412 generates a program (e.g., program 420) based at least in part on the new scanset.

At operation 912, query coordinator 250 provides the program to an execution node (e.g., execution node 302-1) for executing the particular query plan.

Figure 10:
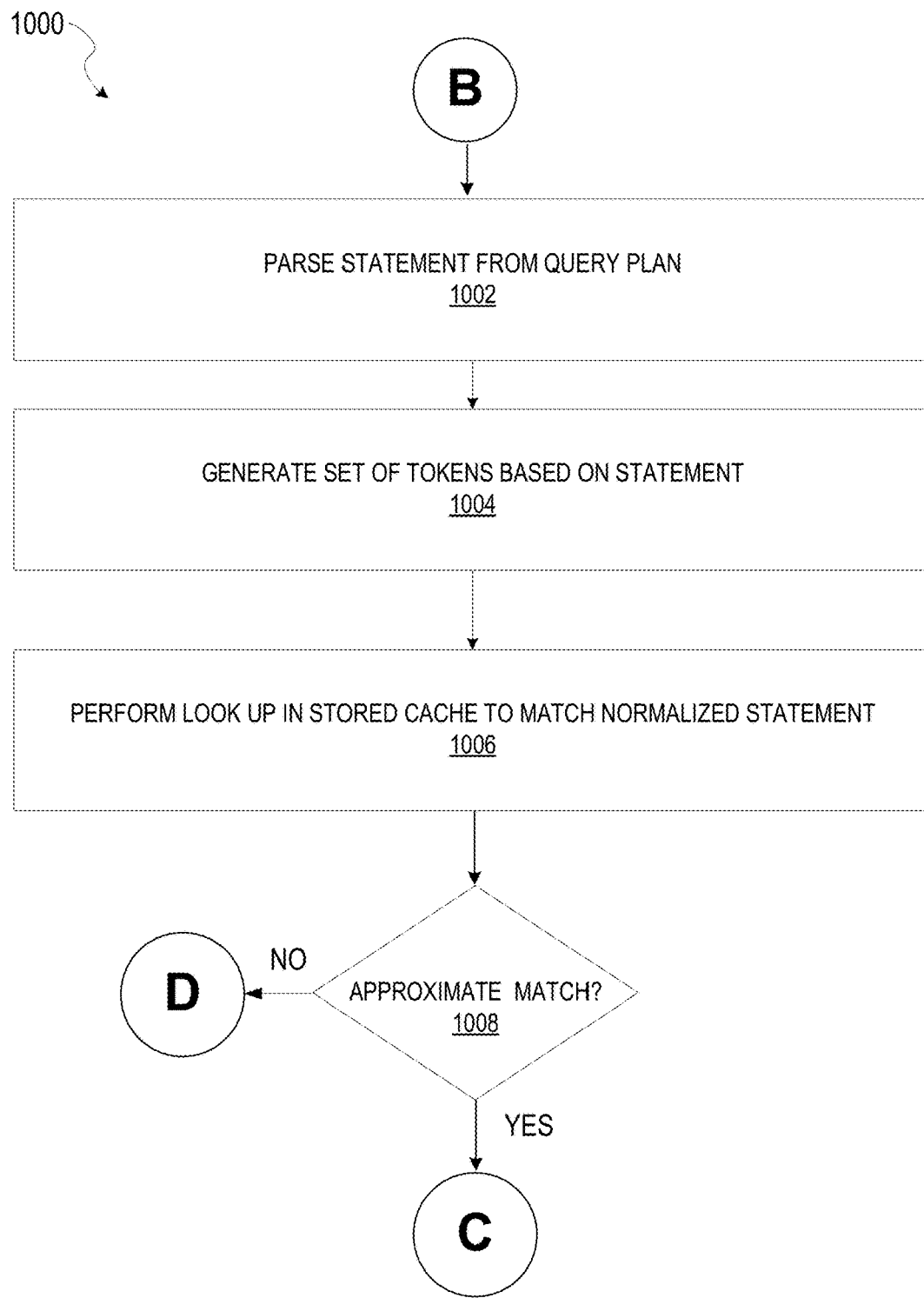
FIG. 10 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102. Accordingly, the method 1000 is described below, by way of example with reference thereto. However, it shall be appreciated that method 1000 may be deployed on various other hardware configurations and is not intended to be limited to deployment within the network-based database system 102.

At operation 1002, compiler 412, in response to not determining the exact match, parses the set of statements from the query.

At operation 1004, compiler 412 generates a set of tokens based on the parsing.

At operation 1006, compiler 412 performs a second lookup operation in the stored plan cache based at least in part on the set of tokens to determine an approximate match of a normalized statement corresponding to a second particular query plan in the stored plan cache.

In embodiments, compiler 412 generates the normalized statement corresponding to the second particular query plan, the second particular query plan including a second set of statements, the generating comprising: removing white spaces from the set of statements; removing a set of comments from the set of statements, the set of comments comprising at least one annotation or textual information that is ignored by a compiler; determining a set of fully qualified names of objects; and parameterizing a set of constants from the set of statements.

At operation 1008, compiler 412 determines if there is the approximate match. If the approximate match is found, then additional operations are performed as discussed below in FIG. 11. Alternatively, if the approximate match is not found, then additional operations are performed as discussed below in FIG. 12.

Figure 11:
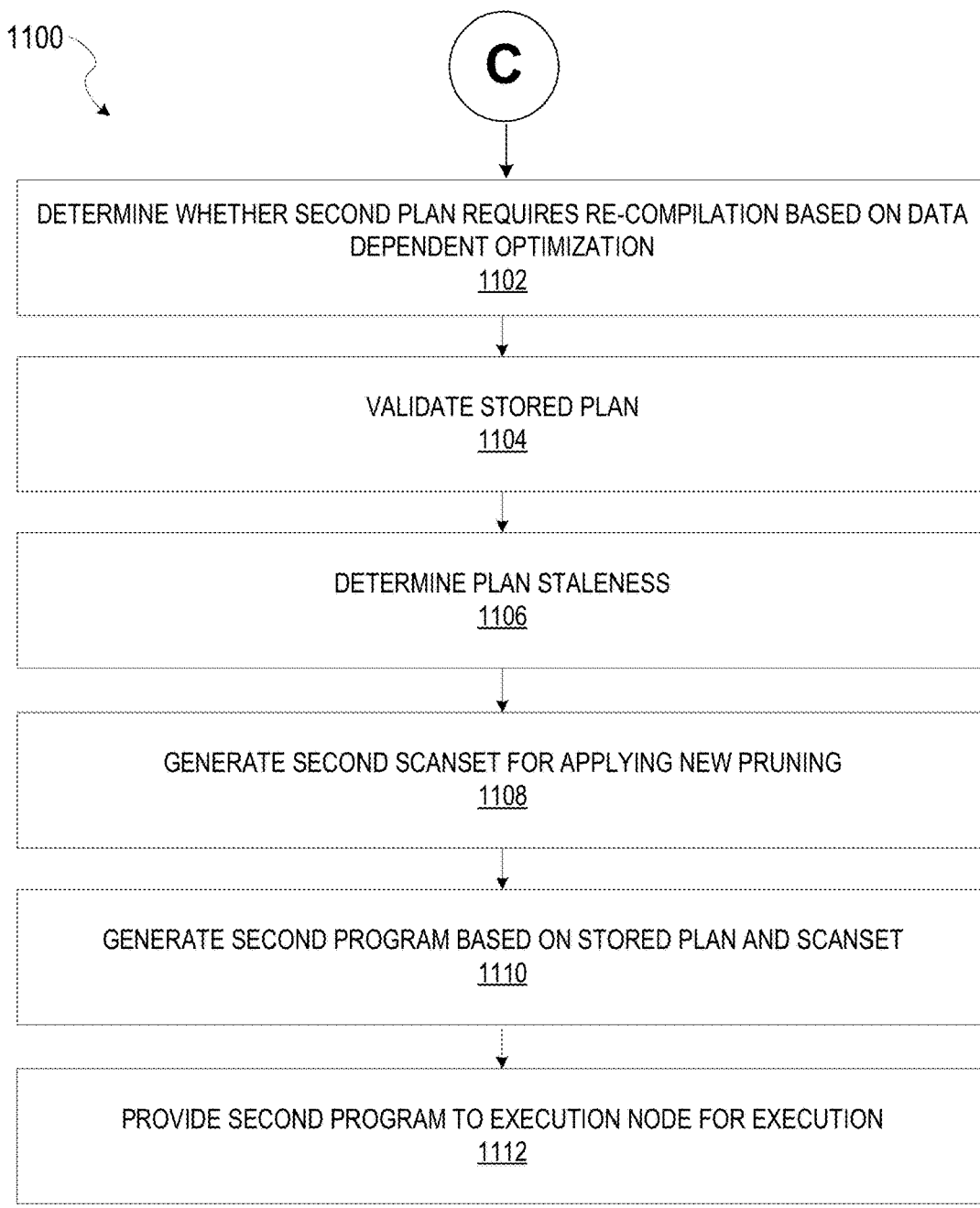
FIG. 11 is a flow diagram illustrating operations of a database system in performing a method, in accordance with some embodiments of the present disclosure.

FIG. 11 is a flow diagram illustrating operations of a database system in performing a method, in accordance with some embodiments of the present disclosure. The method 1100 may be embodied in computer-readable instructions for execution by one or more hardware components (e.g., one or more processors) such that the operations of the method 1100 may be performed by components of network-based database system 102. Accordingly, the method 1100 is described below, by way of example with reference thereto. However, it shall be appreciated that method 1100 may be deployed on various other hardware configurations and is not intended to be limited to deployment within the network-based database system 102.

At operation 1102, compiler 412, in response to the second lookup operation determining the approximate match, determines whether the second particular query plan requires re-compilation based on a second data dependent optimization.

At operation 1104, compiler 412, in response to the second particular query plan not requiring re-compilation, validates the second particular query plan.

At operation 1106, compiler 412, in response to validating the second particular query plan, determines whether the second particular query plan is stale.

At operation 1108, compiler 412, in response to the second particular query plan not being stale, generates a new second scanset based at least in part on a second set of files that were pruned during a previous compilation of the second particular query plan.

At operation 1110, compiler 412 generates a second program based at least in part on the new second scanset.

Figure 12:
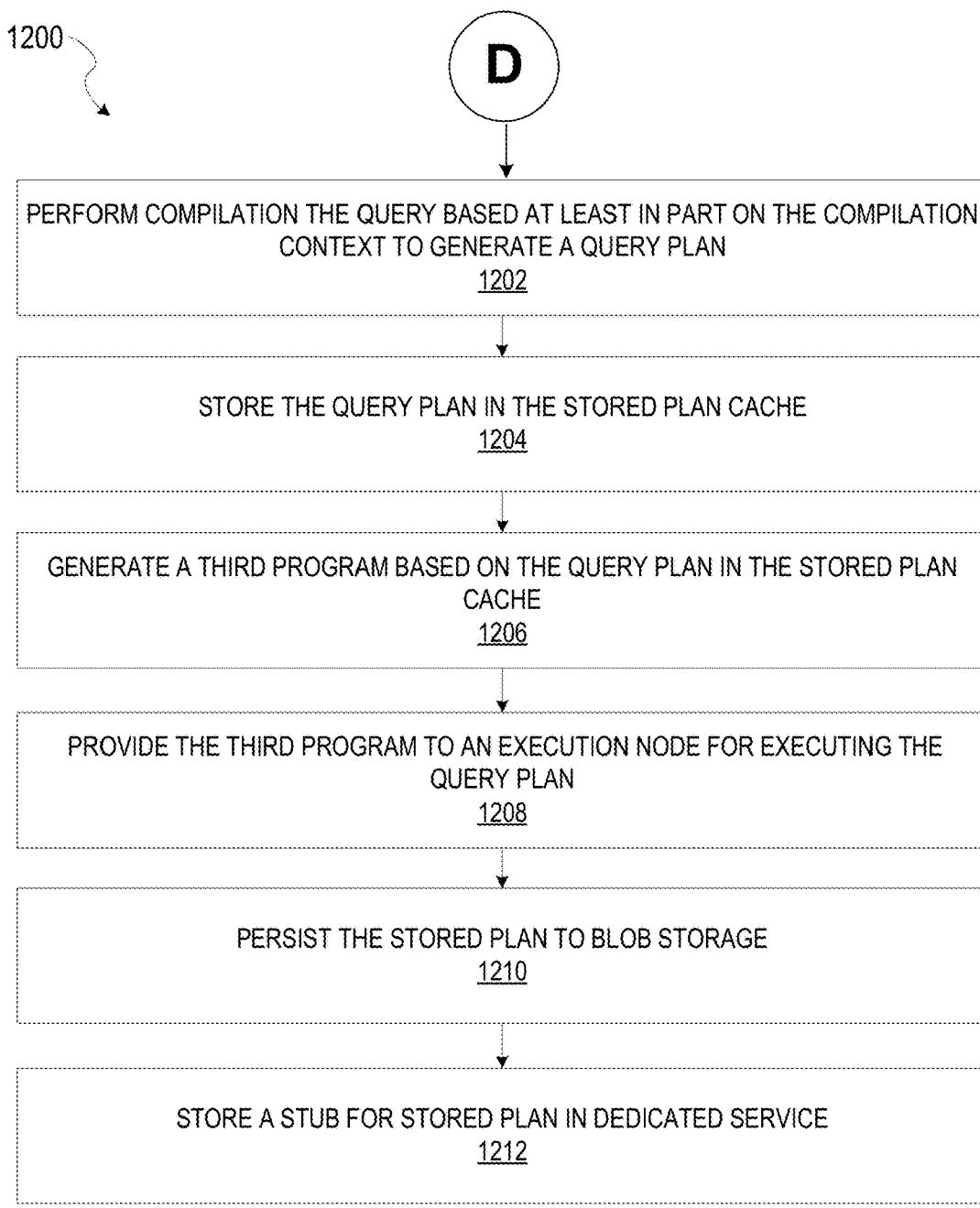
FIG. 12 is a flow diagram illustrating operations of a database system in performing a method, in accordance with some embodiments of the present disclosure.

At operation 1112, query coordinator 250 provides the second program to an execution node for executing the second particular query plan FIG. 12 is a flow diagram illustrating operations of a database system in performing a method, in accordance with some embodiments of the present disclosure. The method 1200 may be embodied in computer-readable instructions for execution by one or more hardware components (e.g., one or more processors) such that the operations of the method 1200 may be performed by components of network-based database system 102. Accordingly, the method 1200 is described below, by way of example with reference thereto. However, it shall be appreciated that method 1200 may be deployed on various other hardware configurations and is not intended to be limited to deployment within the network-based database system 102.

At operation 1202, compiler 412, in response to the second lookup operation not determining the approximate match, performs a compilation of the query based at least in part on the compilation context to generate a query plan, storing the query plan in the stored plan, At operation 1204, compiler 412 stores the query plan in the stored plan cache (e.g., stored plan cache 414).

At operation 1206, compiler 412 generates a third program based on the query plan in the stored plan cache.

At operation 1208, query coordinator 250 provides the third program to an execution node (e.g., execution node 302-1) for executing the query plan.

At operation 1210, query coordinator 250 stores the query plan in blob storage, the blob storage being provided by a cloud storage platform (e.g., storage platform 104-1).

At operation 1212, query coordinator 250 stores a stub for the query plan in a stored plan cache service (e.g., the stored plan cache service 260).

Figure 13:
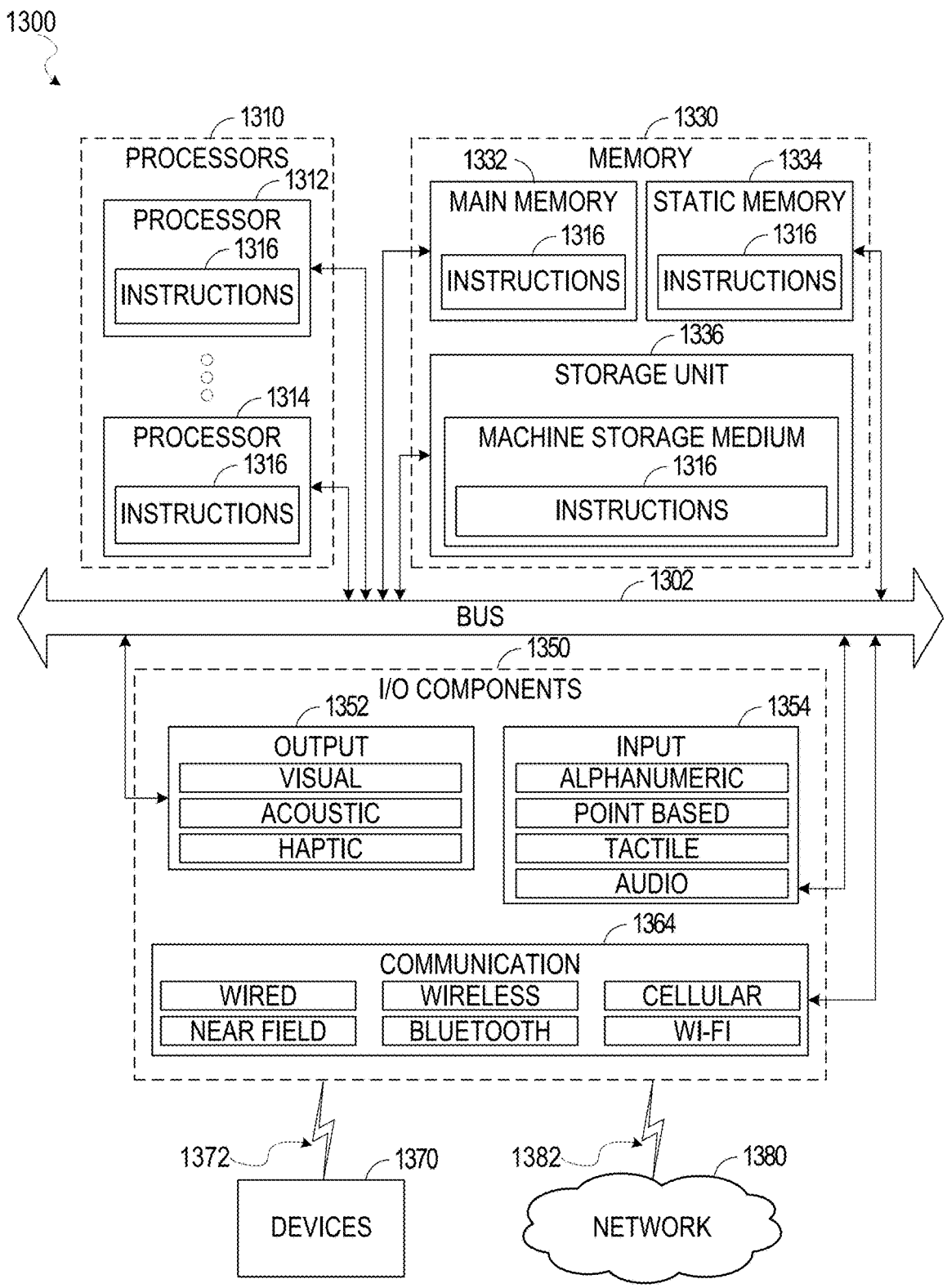
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of a machine 1300 in the form of a computer system within which a set of instructions may be executed for causing the machine 1300 to perform any one or more of the methodologies discussed herein, according to an example embodiment. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. For example, the instructions 1316 may cause the machine 1300 to execute any one or more operations of any one or more of the methods described above. As another example, the instructions 1316 may cause the machine 1300 to implement portions of the functionality illustrated in any one or more of the previously mentioned figures discussed above. In this way, the instructions 1316 transform a general, non-programmed machine into a particular machine 1300 (e.g., the compute service manager 108-1, the execution platform 110-1, and the user device 112) that is specially configured to carry out any one of the described and illustrated functions in the manner described herein.

In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but be not limited to, a server computer, a client computer, a personal computer (PC), a tablet computer, a laptop computer, a netbook, a smart phone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 includes processors 1310, memory 1330, and input/output (I/O) components 1350 configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310 such as via the bus 1302. The main memory 1332, the static memory 1334, and the storage unit 1336 store the instructions 1316 embodying any one or more of the methodologies or functions described herein. The instructions 1316 may also reside, completely or partially, within the main memory 1332, within the static memory 1334, within the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 may include a network interface component or another suitable device to interface with the network 1380. In further examples, the communication components 1364 may include wired communication components, wireless communication components, cellular communication components, and other communication components to provide communication via other modalities. The devices 1370 may be another machine or any of a wide variety of peripheral devices (e.g., a peripheral device coupled via a universal serial bus (USB)). For example, as noted above, the machine 1300 may correspond to any one of the compute service manager 108-1, the execution platform 110, and the devices 1370 may include the user device 112 or any other computing device described herein as being in communication with the network-based database system 102 or the storage platform 104.

Executable Instructions and Machine Storage Medium

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a WiFi® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over the network 1380 using a transmission medium via a network interface device (e.g., a network interface component included in the communication components 1364) and utilizing any one of a number of well-known transfer protocols (e.g., hypertext transfer protocol (HTTP)). Similarly, the instructions 1316 may be transmitted or received using a transmission medium via the coupling 1372 (e.g., a peer-to-peer coupling) to the devices 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 1300 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The invention claimed is:

1. A network-based database system comprising:
   at least one hardware processor; and
   a memory storing instructions that cause the at least one hardware processor to perform operations comprising:
   receiving a query, the query including a set of statements for performing the query;
   populating a compilation context based at least in part the query;
   providing the compilation context to a compiler;
   invoking the compiler to perform a compilation process based on the compilation context, the compilation process comprising:
   performing a lookup operation on a stored plan cache for an exact match based on information from the compilation context, the stored plan cache including a set of stored query plans;
   determining whether the exact match of a particular query plan is found in the stored plan cache to avoid compiling the query using the compilation context;
   in response to determining an exact match, determining whether the particular query plan requires re-compilation based on a data dependent optimization;
   in response to the particular query plan not requiring re-compilation, validating the particular query plan;
   in response to the particular query plan being validated, determining whether the particular query plan is stale;
   in response to the particular query plan not being stale, generating a new scanset based at least in part on a set of files that were pruned during a previous compilation of the particular query plan;
   generating a program based at least in part on the new scanset; and
   providing the program to an execution node for executing the particular query plan.

2. The system of claim 1, wherein the compilation context includes text comprising a structured query language (SQL) statement, a bind variable, and a reference to a session.

3. The system of claim 1, wherein determining whether the particular query plan requires re-compilation based on the data dependent optimization comprises:
   determining whether a plan cache entry corresponding to the particular query plan includes a data property constraint, the data property constraint being utilized when the particular query plan was previously compiled and stored as part of the plan cache entry;
   determining a set of data properties based on current metadata associated with a set of source tables or files associated with the particular query plan; and
   determining whether the data property constraint still holds based on the set of data properties, wherein the data property constraint comprises a condition that is met based on a set of source tables or files associated with the particular query plan.

4. The system of claim 3, wherein the operations further comprise:
   in response to the data property constraint not holding, invalidating the plan cache entry; and
   re-compiling the query based at least in part on the compilation context.

5. The system of claim 3, wherein the operations further comprise:
   in response to the data property constraint holding, providing the particular query plan corresponding to the plan cache entry to an execution node for executing the query.

6. The system of claim 1, wherein the operations further comprise:
   in response to not determining the exact match, parsing the set of statements from the query to generate a set of tokens; and
   performing a second lookup operation in the stored plan cache based at least in part on the set of tokens to determine an approximate match of a normalized statement corresponding to a second particular query plan in the stored plan cache.

7. The system of claim 6, wherein the operations further comprise:
generating the normalized statement corresponding to the second particular query plan, the second particular query plan including a second set of statements, the generating comprising:
removing white spaces from the set of statements;
removing a set of comments from the set of statements, the set of comments comprising at least one annotation or textual information that is ignored by a compiler;
determining a set of fully qualified names of objects; and
parameterizing a set of constants from the set of statements.

8. The system of claim 6, wherein the operations further comprise:
in response to the second lookup operation not determining the approximate match, performing a compilation of the query based at least in part on the compilation context to generate a query plan;
storing the query plan in the stored plan cache;
generating a third program based on the query plan in the stored plan cache;
providing the third program to an execution node for executing the query plan;
storing the query plan in blob storage, the blob storage being provided by a cloud storage platform; and
storing a stub for the query plan in a stored plan cache service.

9. The system of claim 6, wherein the operations further comprise:
in response to the second lookup operation determining the approximate match, determining whether the second particular query plan requires re-compilation based on a second data dependent optimization;
in response in response to the second particular query plan not requiring re-compilation, validating the second particular query plan;
in response to validating the second particular query plan, determining whether the second particular query plan is stale;
in response to the second particular query plan not being stale, generating a new second scanset based at least in part on a second set of files that were pruned during a previous compilation of the second particular query plan;
generating a second program based at least in part on the new second scanset; and
providing the second program to an execution node for executing the second particular query plan.

10. A method comprising:
receiving a query, the query including a set of statements for performing the query;
populating a compilation context based at least in part the query;
providing the compilation context to a compiler;
invoking the compiler to perform a compilation process based on the compilation context, the compilation process comprising:
performing a lookup operation on a stored plan cache for an exact match based on information from the compilation context, the stored plan cache including a set of stored query plans;
determining whether the exact match of a particular query plan is found in the stored plan cache to avoid compiling the query using the compilation context;
in response to determining an exact match, determining whether the particular query plan requires re-compilation based on a data dependent optimization;
in response to the particular query plan not requiring re-compilation, validating the particular query plan;
in response to the particular query plan being validated, determining whether the particular query plan is stale;
in response to the particular query plan not being stale, generating a new scanset based at least in part on a set of files that were pruned during a previous compilation of the particular query plan;
generating a program based at least in part on the new scanset; and
providing the program to an execution node for executing the particular query plan.

11. The method of claim 10, wherein the compilation context includes text comprising a structured query language (SQL) statement, a bind variable, and a reference to a session.

12. The method of claim 10, wherein determining whether the particular query plan requires re-compilation based on the data dependent optimization comprises:
determining whether a plan cache entry corresponding to the particular query plan includes a data property constraint, the data property constraint being utilized when the particular query plan was previously compiled and stored as part of the plan cache entry;
determining a set of data properties based on current metadata associated with a set of source tables or files associated with the particular query plan; and
determining whether the data property constraint still holds based on the set of data properties, wherein the data property constraint comprises a condition that is met based on a set of source tables or files associated with the particular query plan.

13. The method of claim 12, further comprising:
in response to the data property constraint not holding, invalidating the plan cache entry; and
re-compiling the query based at least in part on the compilation context.

14. The method of claim 12, further comprising:
in response to the data property constraint holding, providing the particular query plan corresponding to the plan cache entry to an execution node for executing the query.

15. The method of claim 10, further comprising:
in response to not determining the exact match, parsing the set of statements from the query to generate a set of tokens; and
performing a second lookup operation in the stored plan cache based at least in part on the set of tokens to determine an approximate match of a normalized statement corresponding to a second particular query plan in the stored plan cache.

16. The method of claim 15, further comprising:
generating the normalized statement corresponding to the second particular query plan, the second particular query plan including a second set of statements, the generating comprising:
removing white spaces from the set of statements;
removing a set of comments from the set of statements, the set of comments comprising at least one annotation or textual information that is ignored by a compiler;
determining a set of fully qualified names of objects; and
parameterizing a set of constants from the set of statements.

17. The method of claim 15, further comprising:
in response to the second lookup operation not determining the approximate match, performing a compilation of the query based at least in part on the compilation context to generate a query plan;
storing the query plan in the stored plan cache;
generating a second program based on the query plan in the stored plan cache;
providing the second program to an execution node for executing the second particular query plan;
storing the query plan in blob storage, the blob storage being provided by a cloud storage platform; and
storing a stub for the query plan in a stored plan cache service.

18. The method of claim 15, further comprising:
in response to the second lookup operation determining the approximate match, determining whether the second particular query plan requires re-compilation based on a second data dependent optimization;
in response to the second particular query plan not requiring re-compilation, validating the second particular query plan;
in response to validating the second particular query plan, determining whether the second particular query plan is stale;
in response to the second particular query plan not being stale, generating a new second scanset based at least in part on a second set of files that were pruned during a previous compilation of the second particular query plan;
generating a second program based at least in part on the new second scanset; and
providing the second program to an execution node for executing the second particular query plan.

19. A non-transitory computer-storage medium comprising instructions that, when executed by one or more processors of a machine, configure the machine to perform operations comprising:
receiving a query, the query including a set of statements for performing the query;
populating a compilation context based at least in part the query;
providing the compilation context to a compiler;
invoking the compiler to perform a compilation process based on the compilation context, the compilation process comprising:
performing a lookup operation on a stored plan cache for an exact match based on information from the compilation context, the stored plan cache including a set of stored query plans;
determining whether the exact match of a particular query plan is found in the stored plan cache to avoid compiling the query using the compilation context;
in response to determining an exact match, determining whether the particular query plan requires re-compilation based on a data dependent optimization;
in response to the particular query plan not requiring re-compilation, validating the particular query plan;
in response to the particular query plan being validated, determining whether the particular query plan is stale;
in response to the particular query plan not being stale, generating a new scanset based at least in part on a set of files that were pruned during a previous compilation of the particular query plan;
generating a program based at least in part on the new scanset; and providing the program to an execution node for executing the particular query plan.

20. The non-transitory computer-storage medium of claim 19, wherein the compilation context includes text comprising a structured query language (SQL) statement, a bind variable, and a reference to a session.

21. The non-transitory computer-storage medium of claim 19, wherein determining whether the particular query plan requires re-compilation based on the data dependent optimization comprises:
determining whether a plan cache entry corresponding to the particular query plan includes a data property constraint, the data property constraint being utilized when the particular query plan was previously compiled and stored as part of the plan cache entry;
determining a set of data properties based on current metadata associated with a set of source tables or files associated with the particular query plan; and
determining whether the data property constraint still holds based on the set of data properties, wherein the data property constraint comprises a condition that is met based on a set of source tables or files associated with the particular query plan.

22. The non-transitory computer-storage medium of claim 21, wherein the operations further comprise:
in response to the data property constraint not holding, invalidating the plan cache entry; and
re-compiling the query based at least in part on the compilation context.

23. The non-transitory computer-storage medium of claim 21, wherein the operations further comprise:
in response to the data property constraint holding, providing the particular query plan corresponding to the plan cache entry to an execution node for executing the query.

24. The non-transitory computer-storage medium of claim 19, wherein the operations further comprise:
in response to not determining the exact match, parsing the set of statements from the query to generate a set of tokens; and
performing a second lookup operation in the stored plan cache based at least in part on the set of tokens to determine an approximate match of a normalized statement corresponding to a second particular query plan in the stored plan cache.

25. The non-transitory computer-storage medium of claim 24, wherein the operations further comprise:
generating the normalized statement corresponding to the second particular query plan, the second particular query plan including a second set of statements, the generating comprising:
removing white spaces from the set of statements;
removing a set of comments from the set of statements, the set of comments comprising at least one annotation or textual information that is ignored by a compiler;
determining a set of fully qualified names of objects; and
parameterizing a set of constants from the set of statements.

26. The non-transitory computer-storage medium of claim 24, wherein the operations further comprise:
in response to the second lookup operation not determining the approximate match, performing a compilation of the query based at least in part on the compilation context to generate a query plan;
storing the query plan in the stored plan cache;
generating a third program based on the query plan in the stored plan cache;

providing the third program to an execution node for executing the query plan;

storing the query plan in blob storage, the blob storage being provided by a cloud storage platform; and storing a stub for the query plan in a stored plan cache service.

27. The non-transitory computer-storage medium of claim 24, wherein the operations further comprise:

in response to the second lookup operation determining the approximate match, determining whether the second particular query plan requires re-compilation based on a second data dependent optimization;

in response to the second particular query plan not requiring re-compilation, validating the second particular query plan;

in response to validating the second particular query plan, determining whether the second particular query plan is stale;

in response to the second particular query plan not being stale, generating a new second scanset based at least in part on a second set of files that were pruned during a previous compilation of the second particular query plan;

generating a second program based at least in part on the new second scanset; and providing the second program to an execution node for executing the second particular query plan.

* * * * *